United States Patent

Hoffmeyer et al.

[15] 3,650,167
[45] Mar. 21, 1972

[54] METHOD OF MANUFACTURING MAGNETIC LAMINATIONS FOR DYNAMOELECTRIC MACHINE

[72] Inventors: William R. Hoffmeyer, Holland; Alvin L. Rediger, Zeeland, both of Mich.

[73] Assignee: General Electric Company

[22] Filed: July 2, 1970

[21] Appl. No.: 52,014

Related U.S. Application Data

[62] Division of Ser. No. 840,188, July 9, 1969, Pat. No. 3,588,561.

[52] U.S. Cl. ..................... 83/41, 29/596, 83/49, 83/926
[51] Int. Cl. ........................................ B26d 3/00
[58] Field of Search ............ 29/596; 310/216; 83/30, 39–41, 83/49, 926

[56] References Cited

UNITED STATES PATENTS 3,107,566  10/1963  Archer........................83/40

FOREIGN PATENTS OR APPLICATIONS 547,190  3/1932  Germany....................83/40

Primary Examiner—Robert L. Spicer, Jr.
Attorney—John M. Stoudt, Radford M. Reams, Ralph E. Krisher, Jr., Oscar B. Waddell, Joseph B. Forman and Frank L. Neuhauser

[57] ABSTRACT

A method of shaping and forming laminations for a dynamoelectric machine includes severing a number of individual laminations in nested relationship from a single strip of magnetic material. Also disclosed is a dynamoelectric machine stator core of stacked laminations. The core includes a yoke section, a bore inside the yoke section and winding receiving slots extending inwardly from the yoke section. A first mounting opening is formed in the core outside the slots while second and third mounting openings are formed in core material radially outward of the yoke section. The angular distance between the first mounting opening and each of the second and third mounting openings is greater than the angular distance between the second and third mounting openings.

5 Claims, 4 Drawing Figures

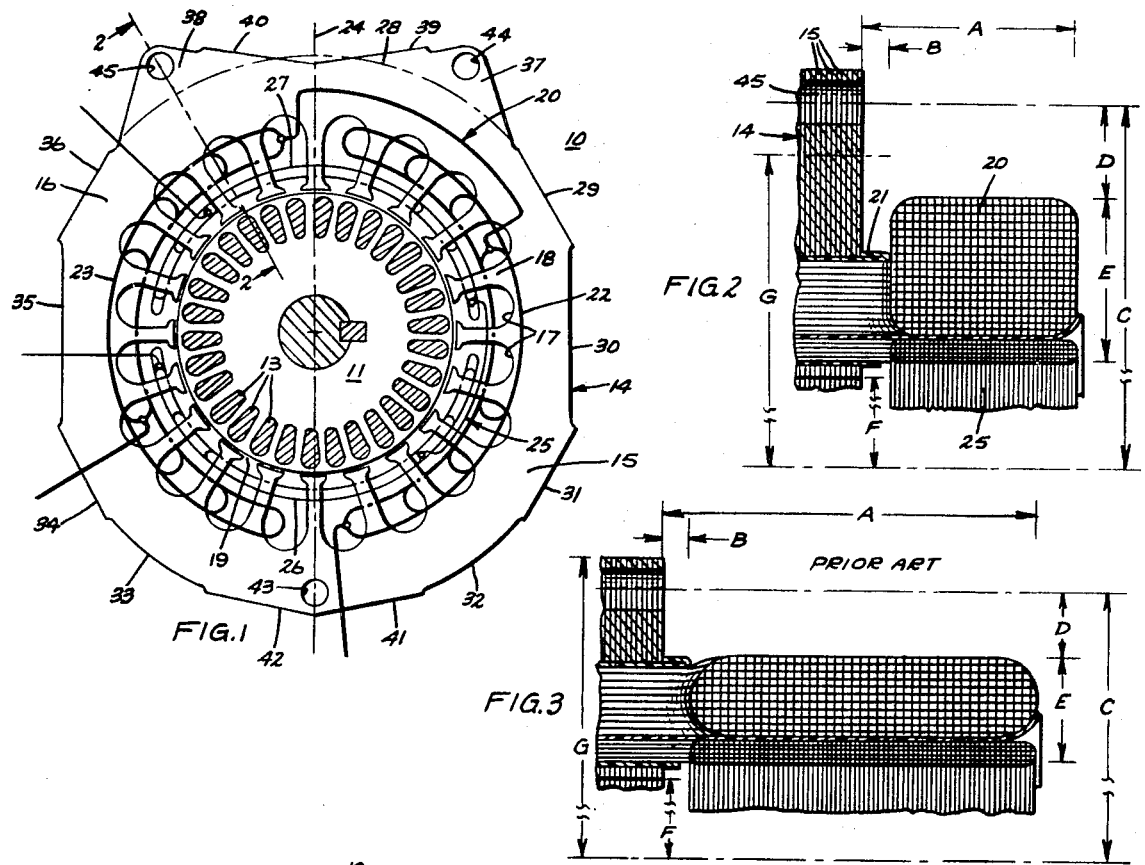
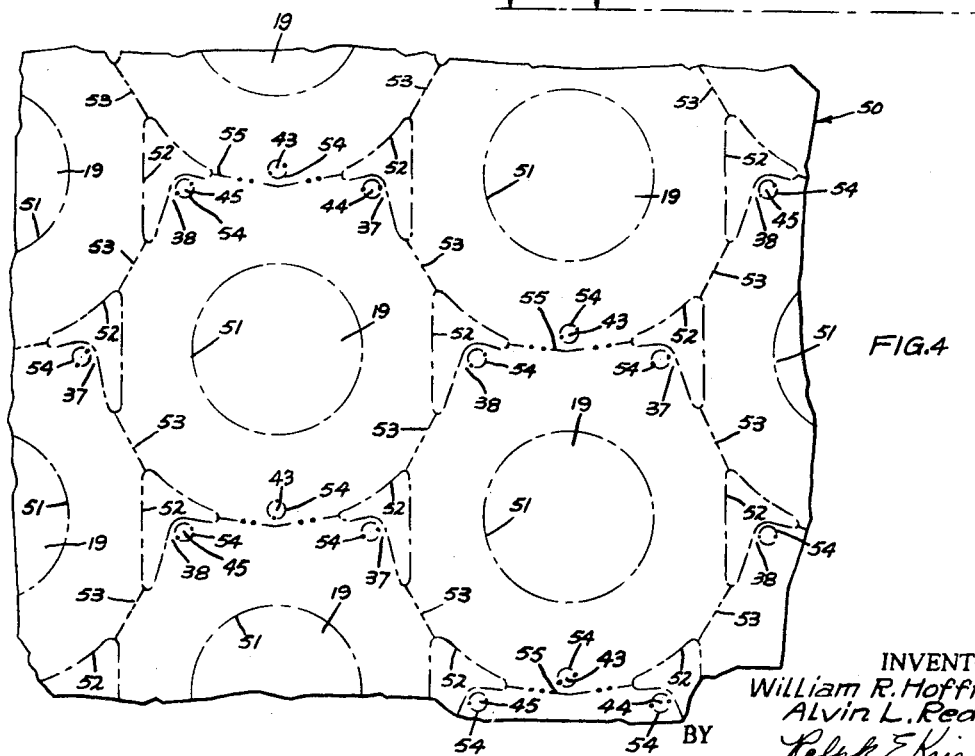

METHOD OF MANUFACTURING MAGNETIC LAMINATIONS FOR DYNAMOELECTRIC MACHINE

CROSS-REFERENCE TO RELATED APPLICATIONS

This is a divisional application of our copending application Ser. No. 840,188 which was filed July 9, 1969 and is assigned to the assignee of this application now U.S. Pat. No. 3,588,561.

BACKGROUND OF THE INVENTION

This invention relates to a method of manufacturing magnetic laminations for use in a dynamoelectric machine which permits effective material utilization, and efficient manufacture and operation of the dynamoelectric machine.

In many dynamoelectric machines the stator is press fit into a surrounding case. Thus the stator laminations may be round and with a diameter just large enough to provide the proper yoke area. This provides an efficient utilization of material within the motor; however, the stator lamination shape may be varied somewhat to efficiently use the magnetic material from which they are made by severing a number of laminations in nested relationship from a single sheet or strip of material. One such configuration and nesting arrangement is shown and described in U.S. Pat. No. 3,154,708, issued to Paul B. Shaffer on Oct. 21, 1964, and assigned to General Electric Company, the assignee of the present invention.

In a number of applications such as, for instance, hermetic motors the stator normally is mounted in the overall device by bolts or equivalent means which pass through mounting openings in the stator. If these mounting openings are provided in the yoke section, they reduce the effectiveness of the yoke as a magnetic path and the motor size must be increased to give equivalent operational characteristics. Also, the bolts will be so close to the stator winding end turns as to make mounting without damage to the end turns very difficult. A number of angularly spaced apart outwardly extending tabs can be provided, as disclosed in U.S. Pat. No. 2,011,060, with the mounting openings formed therein. However, this unduly increases the overall dimensions of the stator and causes substantial waste of magnetic material when forming the laminations in that it tends to prevent close nesting of lamination blanks during manufacture of the core.

SUMMARY OF THE INVENTION

It is accordingly an object of the present invention to provide an improved method of manufacturing magnetic laminations for a dynamoelectric machine.

It is another object of this invention to provide an improved method of making such laminations while effectively utilizing the sheet of magnetic material from which the laminations are formed.

It is a still further object of the present invention to provide an improved method of manufacturing stator laminations which permit efficient severing of a number of laminations in nested relation from a single sheet of magnetic material.

In carrying out the objects in one form, we provide a method that may be employed in the manufacture of an improved dynamoelectric machine stator having a core of magnetic material. The core includes a yoke section, a bore disposed radially inward of the yoke section and a plurality of spaced apart elongated winding receiving slots extending inwardly from the yoke section. The core has a first longitudinally extending mounting opening disposed radially outward of the slots, and second and third longitudinally extending mounting openings disposed radially outward of the yoke section. The angular distance between the first mounting opening and each of the second and third mounting openings respectively is somewhat greater than the angular distance between the second and third mounting openings.

In the practice of our method in one form, a plurality of bores are formed in a sheet of magnetic material in evenly spaced, staggered rows. A pair of cutouts are punched out spaced from each bore to form a pair of projections associated with each bore. One such projection is provided on each side of each row of bores, between each successive pair of bores. The magnetic material then is severed between each cutout and the next adjacent cutouts intermediate the rows. A first mounting opening is punched generally in alignment with each row of bores and generally between each pair of projections and second and third mounting openings are punched in respective ones of each pair of projections. Then the magnetic material is severed between each pair of cutouts along a line disposed between the associated first mounting opening and the associated second and third mounting openings.

In this way it is possible to provide a dynamoelectric machine stator which makes efficient and effective use of the stator material and provides efficient machine operation while, at the same time effectively and efficiently utilizing the magnetic sheet material from which the stator laminations are made.

The subject matter which we regard as our invention is particularly pointed out and distinctly claimed in the concluding portion of this specification. Our invention, itself, however, both as to its organization and method of operation, together with further objects and advantages thereof may be best understood by reference to the following description taken in connection with the accompanying drawing, wherein:

BRIEF DESCRIPTION OF THE DRAWING

FIG. 1 is a front view of one form of a stator that may be manufactured by the practice of our invention, with concentric main and auxiliary windings schematically illustrated on the stator;

FIG. 2 is a somewhat schematic, partial view taken along the line 2—2 of FIG. 1, and illustrating the relative size of various portions of the stator;

FIG. 3 is a somewhat schematic view, partially in cross section, similar to FIG. 2 but showing a portion of a conventional "prior art" stator having a generally circular circumferential configuration for the same application as that of FIGS. 1 and 2; and FIG. 4 is a plan view of a lamination arrangement for the core of FIGS. 1 and 2 by which a number of laminations may be efficiently and effectively severed in closely nested relationship in accordance with our invention.

DESCRIPTION OF THE PREFERRED EMBODIMENTS

Referring now to the drawing in more detail and in particular to FIG. 1, for purposes of explanation and disclosure, one form of the invention may be readily described in connection with a stator 10 for use in a single phase alternating current induction resistance split phase type electric motor designed for a two pole operation. The motor also includes a conventional rotor or secondary member 11 which is mounted on a shaft 12 and is provided with a squirrel cage winding generally indicated at 13. More specifically, as seen in the FIG. 2 exemplification, the stator 10 includes a laminated core 14 formed of a predetermined number of identical stacked laminations 15 (see FIG. 2) punched or stamped from a sheet of suitable magnetic material, all of which will be more particularly described in connection with FIG. 4.

For convenience and simplicity of disclosure, the same designations will be used hereafter to identify components of the individual laminations and the corresponding core structure formed when the laminations are placed together in stacked relation. Each lamination includes perforations and recesses which, when aligned, form the core now to be described. Still referring to FIG. 1, the core 14 includes an outer, generally circular or ring-like yoke section 16 and elongated winding receiving slots 17 extending inwardly therefrom. Teeth sections 18 are disposed between the slots 17 and define a cylindrical rotor receiving bore 19, which is disposed radially inwardly of the yoke section.

The slots are distributed circumferentially around the core, the main winding 20 is accommodated in the slots and insulated therefrom by a thin cover or slot liner 21 (FIG. 2) of insulating material disposed over the slot walls and core sides to prevent grounding of the winding. The main winding has two polar coil groups 22 and 23 which are respectively received in predetermined ones of the slots in a well-known distributed manner and define an axis 24 extending between their adjacent ends. An auxiliary winding 25, a start winding in the illustrated exemplification, is provided and consists of two coil groups 26 and 27 which are distributively wound in predetermined ones of the slots 17 angularly offset 90 electrical degrees with respect to the main winding to provide a quadrature start winding arrangement.

The arc 28 indicates the radius of a round stator having operational characteristics generally equivalent to the illustrated stator. It will be noted that the segments 29, 30, 31, 32, 33, 34, 35, and 36 of the outer peripheral surface or edge of the core 14 are either very short cords or are arcs of circles having radii which are the same as or closely approximate the radius of arc 28 so that the yoke section 16 closely approximates the yoke section of a generally equivalent round stator. The core also includes a pair of projections 37 and 38 which extend radially outwardly beyond the yoke section 16. The segments 39 and 40 of the outer periphery of the core between the projections 37 and 38 are generally V-shaped and at their apex extend inwardly of the arc 28 adjacent the axis 24. It will be noted that, adjacent the other end of the axis 24, the segments 41 and 42 of the core periphery are generally V-shaped and have their apex disposed outwardly of the core. In fact, the segments 41 and 42 are complementary in shape to the segments 39 and 40. A mounting opening 43 is formed in the core adjacent one end of the axis 24 and close to the apex formed by the peripheral segments 41 and 42 so as to be radially outward of the slots. Additional mounting openings 44 and 45 are formed in the projections 37 and 38 respectively and are disposed radially outwardly of the yoke section 16. It will be noted that the angular distance between mounting opening 43 and each of the mounting openings 44 and 45 respectively is somewhat larger than the angular distance between the mounting openings 44 and 45. We have found that for best overall results in utilizing the advantages of the teachings presented herein, the angular distance between the openings 44 and 45 should be somewhat less than 90 mechanical degrees. By way of example, in the particular stator illustrated the angular distance between openings 44 and 45 is 60°. The angular distance from opening 43 to each of the openings 44 and 45 is 150°.

Also, the mounting openings are symmetric with respect to axis 24. That is, opening 43 is on the axis while openings 44 and 45 are spaced 30 degrees to either side of the axis. While mounting opening 43 is disposed within the radially outer limits of yoke section 16, it is positioned in effect between the ends of adjacent main winding coil groups where there will be a minimum interference by the main winding end turns with assembly of the mounting bolt into opening 43. Mounting openings 44 and 45, which are adjacent the sides of main winding coil groups, are outside the yoke section and located away from coil end turns. Thus the illustrated arrangement provides for excellent utilization of the yoke section and minimum potential interference by the winding end turns, even when pressed back in the manner shown in FIG. 2, with installation of mounting bolts or other mounting means in these openings.

It will be understood that the mounting openings are adapted to receive elongated bolts or equivalent means for mounting the stator in an overall structure. These bolts also may be used to assist in holding the laminations 15 in the proper stacked relation. However, the laminations may also be held in the proper stacked relationship by any other suitable means, such as a number of welds extending longitudinally of the core or by the use of interlaminate adhesive material to form a bonded core, such as described in U.S. Pat. No. 3,299,304, issued to Bobbie B. Hull on Jan. 17, 1967, and assigned to General Electric Company, assignee of the present invention. However, in a number of applications such as hermetic motors, regardless of the means used for securing the stator laminations together, it is most common to mount the stator by means of bolts or similar mounting members.

It is also highly desirable to provide clearance between the openings and the main winding end turns so as to provide sufficient space for installing the bolts into the openings and any associated nuts and room for tools to accomplish this mounting. Also, for a number of well-known reasons, such as a reduction in the overall length of the stator, it is often quite desirable to press the end turns outwardly over the end faces of the stator in the way revealed by FIG. 2. In the conventional round stator this press back would intensify the space problems. For instance, as graphically seen in FIG. 3, any attempt to press back the end turns in a given size stator would tend to cause interference of the end turns with the satisfactory utilization of the mounting openings.

Since mounting opening 43 is between main winding coil groups in the illustrated exemplification of FIG. 1, there is sufficient clearance around it, even when the end turns are pressed back. Similarly, as the mounting openings 44 and 45 are outside the yoke sections, there also is sufficient clearance between them and a pressed-back winding end turn. As will be seen from a further comparison of FIG. 2 and FIG. 3, this is accomplished in a manner which only slightly increases one dimension of the core, that is along radial axis 24 disposed intermediate openings 44, 45 and extending through the rotational axis of the rotatable member.

FIG. 2 illustrates somewhat schematically a portion of the stator of FIG. 1 to show various dimensions of one stator manufactured in accordance with the preferred embodiment of the present invention. In FIG. 2 the illustrated dimensions are as follows:

| Letter | Dimensions |
| --- | --- |
| A | Coil end turn height |
| B | Spacing of coil end turn from core end face |
| C | Mounting opening center line distance from core center line |
| D | Clearance between mounting opening center line and coil end turn |
| E | End turn thickness |
| F | Bore radius |
| G | Peripheral radius of a generally round stator core |

A representative turn distribution for the stator illustrated in FIG. 1 is 33, 40, 46, and 46 turns (inside coil to outside coil) from 0.0359 diameter copper magnet wire in each main winding core group. In the start winding coil groups, the turns of 0.0159 magnet copper wire from inside to outside coil 18, 41, and 68, with the outer coil having 26 backward turns (current flow opposed to the 68 turns) to produce a backlash type start winding arrangement.

As noted previously, FIG. 3 is a somewhat schematic view, partially in cross section, showing a portion of a conventional so-called round stator for the same application as that of FIG. 2, the view being taken through one of four equally spaced apart mounting openings. For ease in comparison the same dimensional letters have been used in FIGS. 2 and 3. The following table shows a comparison of these dimensions for a stator of a given size for use in the same application:

| | FIG. 2 | FIG. 3 |
| --- | --- | --- |
| A | 1.100 in. | 1.780 in. |
| B | 0.125 in. | 0.125 in. |
| C | 2.105 in. | 1.800 in. |
| D | 0.335 in. | 0.310 in. |
| E | 0.750 in. | 0.470 in. |
| F | 0.961 in. | 0.0961 in. |
| G | 1.795 in. | 1.795 in. |

A motor, having a winding distribution similar to that previously mentioned and the above dimensions listed under FIG. 2, was rated at one-fourth horsepower. It operated with a full load efficiency of 73 percent, a power factor of 72 percent, and a full load current of 3.1 amperes, the three more important operational characteristics. The efficiency and power factor are higher and the current lower than those characteristics of a conventional stator of the same rating and stack length having the dimensions listed above under FIG. 3 in spite of the decreased overall axial length for the stator of FIG. 2. It will thus be appreciated from the foregoing, that among other benefits, the FIG. 2 lamination and core construction arrangement provides a stator which makes very efficient use of material to effect savings in material for a given size unit and provides excellent operational characteristics. It also permits a rapid and satisfactory mounting of the stator onto appropriate supporting structures.

Referring now to FIG. 4 there is illustrated both a layout and a schematic representation of one of our preferred methods of severing a plurality of blanks in nested relation from a single sheet of magnetic material 50 to form a plurality of laminations 15 in an efficient manner while effectively utilizing a maximum amount of the magnetic sheet 50. A plurality of spaced apart holes are punched in the magnetic material 50 along the lines 51 to provide a plurality of bores 19. It will be noted from FIG. 4 that these bores are provided in evenly spaced staggered row. A plurality of cutouts are punched along lines 52 with a pair of these cutouts being spaced from each bore to form the projections 37 and 38 associated with each bore, with one projection being spaced on each side of each row of bores and between each successive pair of bores. As indicated by the fact that both the lines 51 and 52 are in the form of two long dashes separated by a short dash (— — —), both the bores 19 and the projections may be formed at the same time.

Next the sheet 50 is severed along the lines 53 between each cutout and the next adjacent cutouts intermediate the rows of bores. The fact that this severing may be done in a second step is indicated by the lines 53 being in the form of two long dashes separated by two short dashes (— — — —). Next the mounting openings 43, 44, and 45 are punched along the lines 54. The mounting openings 44 and 45 are provided in corresponding projections 37 and 38 respectively while one of the mounting openings 43 is positioned generally between each pair of projections 37 and 38 and generally in alignment with each row of bores 19. The lines 54 are in the form of dashes separated by single dots (— · —) to indicate this third punching step.

Then the magnetic material is severed between each pair of cutouts, that is between each pair of the lines 52 along a line 55 which is disposed between the associated first mounting opening 43 and the associated second and third mounting openings 44 and 45. This fourth punching process is indicated by the lines 55 being in the form of two dashes separated by two dots (— ·· —).

With this manner of laying out the blanks or laminations on the sheet of magnetic material and severing them generally in the manner described a number of laminations may be efficiently provided from a single sheet of magnetic material in such a way as to effectively utilize a maximum amount of the material. In fact the cutouts formed by severing along lines 52 and the punchings which form the mounting openings 43, 44, and 45 are substantially all of the scrap material. The punchings removed along the lines 51 to form the bores 19 are subsequently used to construct the secondary member or rotor 11. Conveniently these punching operations may be accomplished by one or more progressive presses utilizing a long strip of magnetic material which is fed through the press in steps.

It will be understood that a number of modifications may be made in the method forming described while remaining within the true spirit and scope of the present invention. For instance, a number of bores 19 and the adjacent cutouts forming associated projections 37 and 38 may be punched simultaneously or in sequence. Also, one the material has been severed along the lines 53, the rows of bores and surrounding magnetic material are effectively separated into strips. Thereafter, the strips may be fed through a single multi-die progressive press so that the remaining punching operations are substantially simultaneously accomplished on the various rows. On the other hand, they may be separated and fed through separate presses so that the additional punchings of each row are accomplished independently of the punchings of the other rows. The winding receiving slots 17 conveniently may be punched at the same time the mounting openings are punched; however, they have not been shown in FIG. 4 both in order to simplify the drawing of FIG. 4 and since the same basic core lamination, such as that illustrated in FIG. 4, could be used in a number of dynamoelectric machines which vary only in the number and configuration of the slots. Some users may find it beneficial to provide the various cutting operations through the severing of the material into separate rows and then punch different patterns of winding receiving slots in the different rows in order to form laminations for various model motors.

It will also be recognized by those skilled in the art that while we have described and illustrated certain aspects of the present invention in connection with the stator for a single phase two pole motor, the disclosed principles are equally applicable to other arrangements. For instance, the number of poles may vary from that shown. Also, the windings may be of multi-phase type with adjacent polar centers being located at other than 90 electrical degrees. Further, the motor may be of the multi-voltage or multi-speed type if desired. Therefore, it will be obvious that changes and modifications may be made in the disclosed preferred embodiment without departing from our invention, and it is aimed in the appended claims to cover all such changes and modifications as fall within the true spirit and scope of the invention.

What we claim as new and desire to secure by Letters Patent of the United States is:

1. A method of severing a plurality of blanks in nested relation from a single sheet of magnetic material to form a plurality of substantially similar stator laminations with each lamination having a yoke section, a bore disposed inwardly of the yoke section, at least a first mounting opening, and second and third mounting openings disposed outwardly of the yoke section and with the angular distance between the first mounting opening and each of the second and third mounting openings respectively being somewhat greater than the angular distance between the second and third mounting openings; the method comprising the steps of: punching a plurality of spaced apart holes in the magnetic material to form a plurality of bores arranged in evenly spaced staggered rows; punching cutouts spaced from each bore to form a pair of projections associated with each bore, with one projection spaced on each side of each row of bores between each successive pair of bores; severing the magnetic material between each cutout and the next adjacent cutouts intermediate the rows; punching a first mounting opening generally in alignment with each row of bores and generally between each pair of projections, and punching second and third mounting openings in respective ones of each pair of projections; and severing the magnetic material between at least one pair of cutouts along a line disposed between the associated first mounting opening and the associated second and third mounting openings.

2. The method of claim 1 wherein the steps of punching a plurality of spaced apart holes in the magnetic material and punching cutouts spaced from each bore are accomplished substantially simultaneously.

3. A method of severing a plurality of blanks in nested relation from a single sheet of magnetic material to form a plurality of substantially similar stator laminations with each lamination having a yoke section, a bore disposed inwardly of the yoke section, at least a first mounting opening, and second and third mounting openings disposed outwardly of the yoke section and with the angular distance between the first mounting opening and each of the second and third mounting openings respectively being somewhat greater than the angular distance between the second and third mounting openings; the method comprising the steps of: punching a plurality of spaced apart holes in the magnetic material to form a plurality of bores arranged in at least one row; punching cutouts spaced from each bore to form a pair of projections associated with each bore, with one projection spaced on each side of the at least one row of bores between successive pairs of bores; severing selected portions of the magnetic material between adjacent cutouts; punching a first mounting opening generally in alignment with at least one row of bores and generally between each pair of projections, and punching second and third mounting openings in respective ones of each pair of projections; and severing the magnetic material between each pair of cutouts along a line disposed between the associated first mounting opening associated with one bore and the associated second and third mounting openings, thereby to form, generally adjacent the first opening and between the pair of projections of each lamination, generally complimentary lamination periphery segments.

4. The method of claim 3 including separating the sheet of magnetic material into strips of magnetic material after severing the selected portions of the magnetic material between adjacent cutouts and thereafter punching the mounting openings in at least one strip of magnetic material independently of at least one other strip of magnetic material.

5. The method of claim 3 wherein the steps of punching a plurality of spaced apart holes in the magnetic material and punching cutouts spaced from each bore are accomplished substantially simultaneously.

* * * * *